(12) United States Patent
Tanaka

(10) Patent No.: US 10,029,189 B2
(45) Date of Patent: Jul. 24, 2018

(54) CRYOPUMP AND METHOD FOR REPAIRING CRYOPUMPS

(71) Applicant: SUMITOMO HEAVY INDUSTRIES, LTD., Tokyo (JP)

(72) Inventor: Hidekazu Tanaka, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 893 days.

(21) Appl. No.: 13/754,530

(22) Filed: Jan. 30, 2013

(65) Prior Publication Data
US 2013/0192276 A1    Aug. 1, 2013

(30) Foreign Application Priority Data
Jan. 31, 2012    (JP) .................. 2012-018834

(51) Int. Cl.
*B01D 8/00* (2006.01)
*B23P 15/26* (2006.01)
*F04B 37/08* (2006.01)

(52) U.S. Cl.
CPC .............. *B01D 8/00* (2013.01); *B23P 15/26* (2013.01); *F04B 37/08* (2013.01); *Y10T 29/49238* (2015.01)

(58) Field of Classification Search
CPC .................. F04B 37/08; B10D 9/00
See application file for complete search history.

(56) References Cited

U.S. PATENT DOCUMENTS

| | | | | |
|---|---|---|---|---|
| 4,254,640 A | * | 3/1981 | Sherer et al. | .................. 68/3 R |
| 5,154,007 A | * | 10/1992 | Piunno et al. | .................. 34/302 |
| 2002/0104320 A1 | * | 8/2002 | Gaudet et al. | .................. 62/55.5 |
| 2006/0032240 A1 | * | 2/2006 | Ehrne | ..................... F04B 37/08 |
| | | | | 62/55.5 |
| 2010/0300185 A1 | * | 12/2010 | Toth | ....................... F16J 15/064 |
| | | | | 73/114.18 |

FOREIGN PATENT DOCUMENTS

| | | |
|---|---|---|
| JP | H04-89875 U | 8/1992 |
| JP | H08-074041 A | 3/1996 |
| JP | 2007-309184 A1 | 11/2007 |
| JP | 2009-133304 A1 | 6/2009 |
| JP | 2011-181246 A1 | 9/2011 |
| WO | WO-2005/052369 A1 | 6/2005 |

* cited by examiner

*Primary Examiner* — Brian King
(74) *Attorney, Agent, or Firm* — Michael Best & Friedrich LLP

(57) ABSTRACT

A cryopump includes a housing, an electrical control unit which controls the cryopump, a purge valve provided on a passage between an external purge gas source and the inside of the housing, a rough valve provided on a passage between an external pump and the inside of the housing, a vent valve provided on a passage between the inside and the outside of the housing, and a Pirani gauge which measures a pressure inside the housing. The electrical control unit is connected to each of the purge valve, rough valve, vent valve, and Pirani gauge via a wire. Each of the wires is provided with a connector on the component side and a connector on the electrical control unit side. The connector on the component side is configured to be attachable to and detachable from the connector on the electrical control unit side.

7 Claims, 6 Drawing Sheets

CRYOPUMP AND METHOD FOR REPAIRING CRYOPUMPS

BACKGROUND OF THE INVENTION

1. Field of the Invention

The present invention relates to a cryopump and a method for repairing a cryopump.

2. Description of the Related Art

A cryopump is a vacuum pump that traps gas molecules by condensing or adsorbing them on cryopanels cooled to a cryogenic temperature so as to pump them. A cryopump is generally used to attain a clean vacuum environment required in a semiconductor circuit manufacturing process or the like. A cryopump is a so-called entrapment vacuum pump and therefore regularly requires regeneration for discharging trapped gas to the outside.

SUMMARY OF THE INVENTION

One aspect of the present invention relates to a cryopump. The cryopump includes a housing for the cryopump, an electrical control unit which controls the cryopump, a purge valve provided on a passage between an external purge gas source and the inside of the housing, a rough valve provided on a passage between an external pump and the inside of the housing, a vent valve provided on a passage between the inside and the outside of the housing, and a pressure gauge which measures a pressure inside the housing. The electrical control unit is connected, via a wire, to at least one of the components that are the purge valve, the rough valve, the vent valve, and the pressure gauge. The wire is provided with a connector on the component side and a connector on the electrical control unit side, and the connector on the component side is configured to be attachable to and detachable from the connector on the electrical control unit side.

Another aspect of the present invention also relates to a cryopump. The cryopump includes an electrical control unit configured to control the cryopump, and a component connected to the electrical control unit via a wire. The wire is provided with a connector on the component side and a connector on the electrical control unit side, and the connector on the component side is configured to be attachable to and detachable from the connector on the electrical control unit side. When the connector on the component side and the connector on the electrical control unit side are disconnected, the component can be removed in a state where the connector on the component side is connected to the component.

Yet another aspect of the present invention relates to a method for repairing the cryopump. The method includes: diagnosing a failure of the cryopump; disconnecting, when a failure is found in a component, the connector on the component side from the connector on the electrical control unit side; removing from the cryopump the component to which the connector on the component side is connected; fitting to the cryopump a new component corresponding to the component; and connecting a connector on the new component side and the connector on the electrical control unit side.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention but to exemplify the invention. The size of the component in each figure may be changed in order to aid understanding. Some of the components in each figure may be omitted if they are not important for explanation.

Since starting a semiconductor circuit manufacturing process requires cost and time, an unexpected stop of the process due to a problem in equipment or the like should be prevented. Accordingly, in order to achieve a vacuum environment required in the manufacturing process, multiple cryopumps are often used. If one cryopump has failed and is under repair, the vacuum environment will be maintained using another cryopump. However, in consideration of the another cryopump becoming more likely to fail with time, the faulty cryopump should desirably be restored as soon as possible.

Accordingly, one of the purposes of the present invention is to provide a cryopump that can be repaired more easily.

In a cryopump according to the present embodiment, electrical components attached to the housing, such as valves and pressure gauges, are modularized, thereby facilitating the attachment and removal of the electrical components. Such modularization especially facilitates a change of an electrical component due to a failure thereof or the like.

Figure 1:
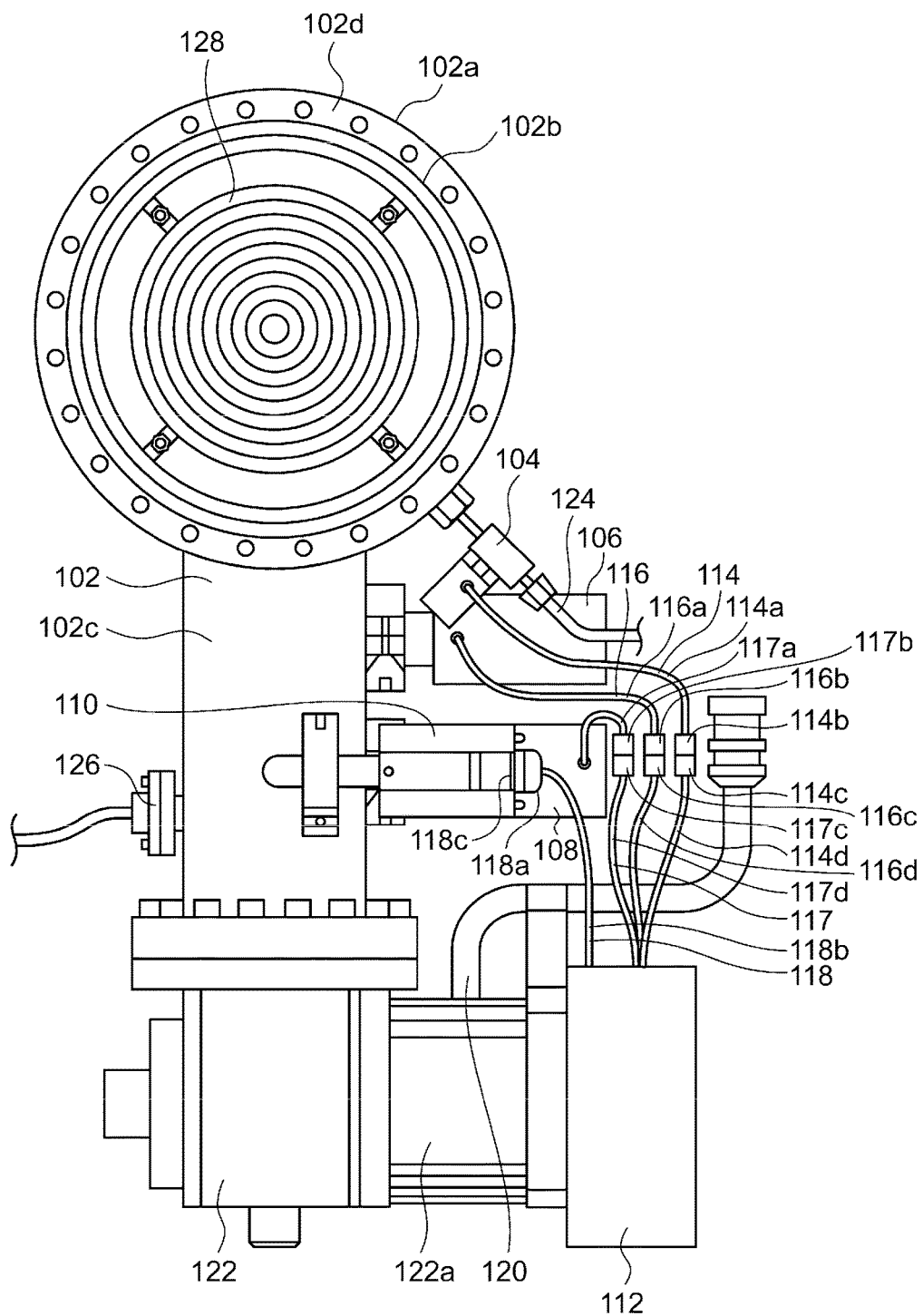
FIG. 1 is a front view of a cryopump according to an embodiment.
Figure 2:
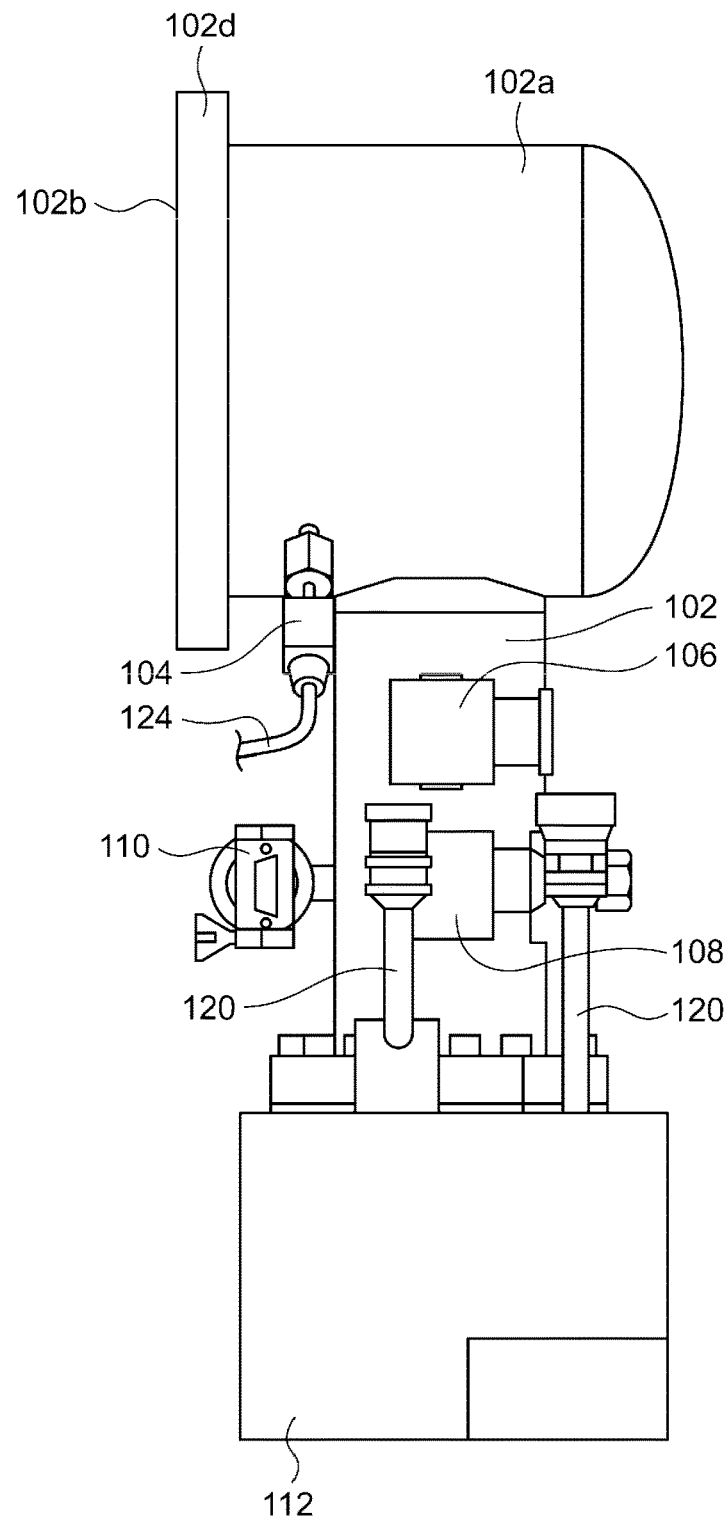
FIG. 2 is a side view of a cryopump according to an embodiment.
Figure 3:
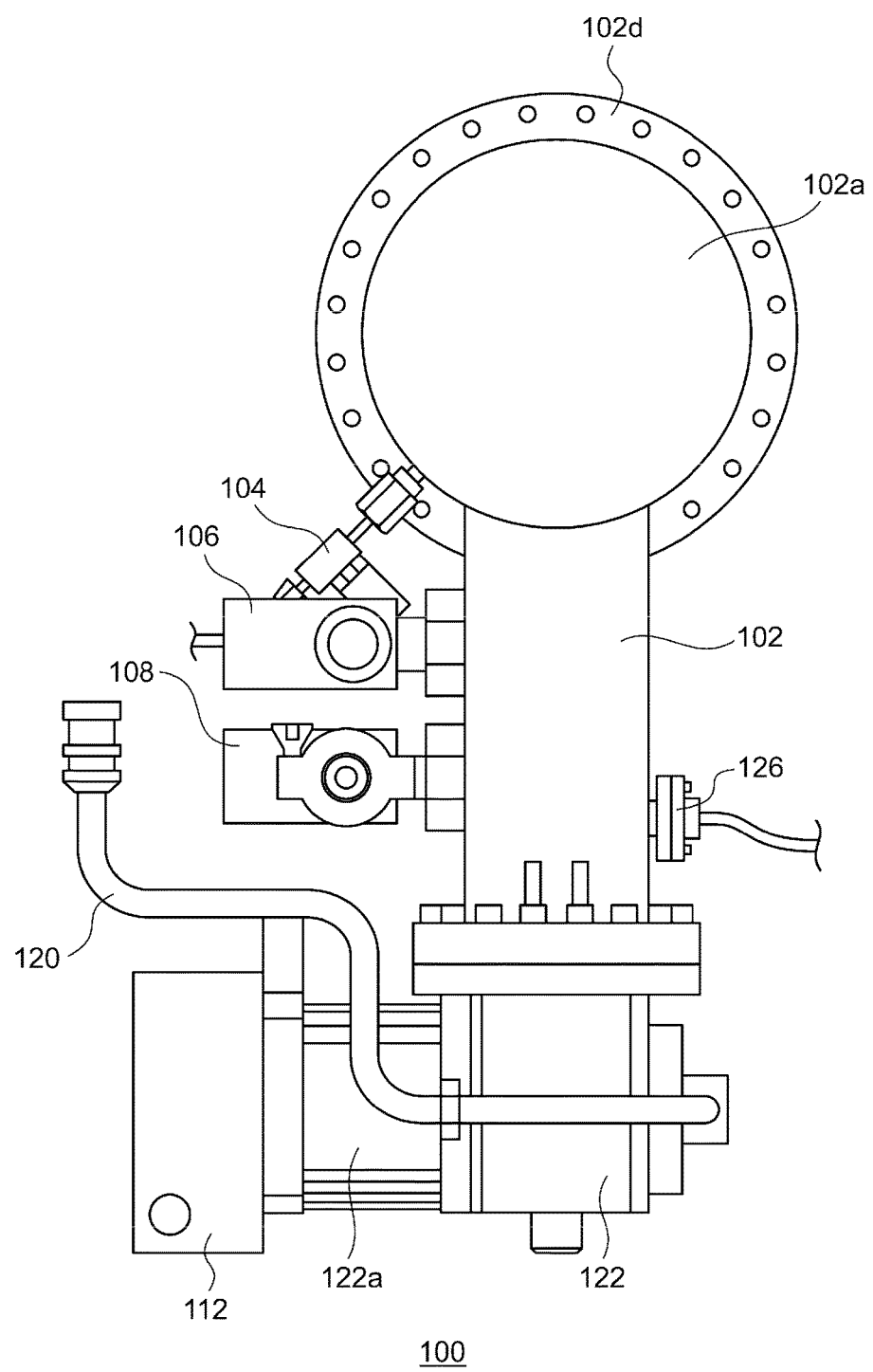
FIG. 3 is a rear view of a cryopump according to an embodiment.

FIG. 1 is a front view of a cryopump 100 according to the present embodiment. Also, FIG. 2 is a side view of the cryopump 100, and FIG. 3 is a rear view the cryopump 100. In FIGS. 2 and 3, the illustration of wiring is omitted. The cryopump 100 is used for vacuum evacuation of a vacuum chamber (not shown) in a vacuum processing apparatus that processes an object in a vacuum environment. The vacuum processing apparatus is, for example, an apparatus used in a semiconductor manufacturing process, such as an ion implantation apparatus or a sputtering apparatus.

The cryopump 100 is mounted to a vacuum chamber and is used to increase the vacuum level inside the vacuum chamber to a level required in a desired process. For example, high vacuum levels of about $10^{-5}$ Pa to $10^{-8}$ Pa can be attained in the vacuum chamber. The cryopump 100 comprises: a housing 102 that houses a cryopanel (not shown); a refrigerator 122 that cools the cryopanel; a purge valve 104 provided on a passage between an external purge gas source (not shown) and the inside of the housing 102; a rough valve 106 provided on a passage between an external rough pump (not shown) and the inside of the housing 102; a vent valve 108 provided on a passage between the inside and the outside of the housing 102; a Pirani gauge 110 that is a pressure gauge for measuring a pressure inside the housing 102; and an electrical control unit 112 connected to the purge valve 104, rough valve 106, vent valve 108, and Pirani gauge 110 via wires 114, 116, 117, and 118, respectively.

Since a well-known configuration may be employed for the internal configuration of the housing 102 including the cryopanel, a detailed description thereof will be omitted.

The electrical control unit 112 controls the cryopump 100. The electrical control unit 112 particularly controls opening and closing of the purge valve 104, rough valve 106, and vent valve 108 and acquires from the Pirani gauge 110 a measured value of a pressure inside the housing 102. The electrical control unit 112 includes a metal casing, and multiple circuit boards disposed in the casing.

The electrical control unit 112 includes, for example, a central processing unit (CPU) that executes various computation processes, a read only memory (ROM) that stores various control programs, a random access memory (RAM) used as a work area to store data or execute a program, an input/output interface, and a memory. Also, the electrical control unit 112 is configured to be capable of communicating with a host controller (not shown) that controls a vacuum processing apparatus. The electrical control unit 112 is fitted to a valve drive motor 122a of the refrigerator 122.

The refrigerator 122 may be a Gifford-McMahon refrigerator (so-called a GM refrigerator), for example. The refrigerator 122 is connected to a compressor (not shown) through a refrigerant pipe 120. The compressor compresses refrigerant gas, i.e., operating gas, such as helium or the like and supplies the gas to the refrigerator 122 through the refrigerant pipe 120.

The flows of operating gas from the compressor to the refrigerator 122 and from the refrigerator 122 to the compressor are switched by a rotary valve (not shown) in the refrigerator 122. The valve drive motor 122a rotates the rotary valve with power supplied from an external power source.

The electrical control unit 112 controls the refrigerator 122 based on the temperature of the cryopanel. Accordingly, a temperature sensor (not shown) is provided on the cryopanel. The temperature sensor is connected to the electrical control unit 112 via a temperature sensor connector 126, which is hermetic and provided on the housing 102. The electrical control unit 112 may control the cooling temperature by controlling the driving frequency of the valve drive motor 122a.

The housing 102 has a portion 102a that is formed into a cylindrical shape one end of which is provided with an opening and the other end of which is closed (hereinafter, referred to as a "trunk portion 102a"). The opening is provided as a pump inlet 102b for receiving gas to be evacuated from the vacuum chamber of a sputtering apparatus or the like to which the cryopump 100 is connected. The pump inlet 102b is defined by the inner surface of the one end of the trunk portion 102a. Also, besides the opening as the pump inlet 102b, another opening (not shown) to which the refrigerator 122 is inserted is formed on the trunk portion 102a. To the another opening, one end of a refrigerator container 102c of a cylindrical shape is fitted, and the other end of the refrigerator container 102c is fitted to the casing of the refrigerator 122. The refrigerator container 102c is a part of the housing 102 and houses a cylinder (not shown) of the refrigerator 122.

At the pump inlet 102b, a mounting flange 102d extends outwardly in the radial direction. The cryopump 100 is mounted to a vacuum chamber via the mounting flange 102d.

In order to prevent the inflow of radiation heat emitted from a vacuum chamber or the like, a baffle 128 is provided in the pump inlet 102b. The baffle 128 is formed as, for example, a louver structure or a chevron structure. Also, the baffle 128 may be formed as concentric circles or may be formed in another shape, such as a lattice or the like. The baffle 128 is cooled by the refrigerator 122.

The purge valve 104 is a solenoid valve for connecting or isolating the cryopump 100 to or from the purge gas source. The solenoid part of the purge valve 104 is connected to the electrical control unit 112 through a purge valve wire 114. The purge gas source may be an apparatus that supplies purge gas such as nitrogen gas. The purge valve 104 is fitted to each of a pipe 124 on the purge gas source side and the trunk portion 102a of the housing 102 via a joint, such as a VCR (registered trademark) joint or a Swagelok (registered trademark) joint.

The purge valve 104 is open when it is energized through the purge valve wire 114; otherwise the purge valve 104 is closed. In other words, the electrical control unit 112 controls opening and closing of the purge valve 104 by supplying or not supplying power to the purge valve wire 114.

During normal operation, i.e., evacuation operation, of the cryopump 100, the purge valve 104 is closed. When it is necessary to supply purge gas into the housing 102 during regeneration of the cryopump 100, the purge valve 104 is opened. By keeping the purge valve 104 open for a certain period of time, a certain amount of purge gas can be supplied into the housing 102.

On the purge valve wire 114 are provided a pair of connectors. The purge valve wire 114 includes a purge valve side wire 114a, a purge valve side connector 114b, a first electrical unit side connector 114c, and a first electrical unit side wire 114d. One end of the purge valve side wire 114a is connected to the solenoid part of the purge valve 104 directly, i.e., without a connector, and the other end of the wire 114a is connected to the purge valve side connector 114b. Also, one end of the first electrical unit side wire 114d is connected to the first electrical unit side connector 114c, and the other end of the wire 114d is provided within the electrical control unit 112. More specifically, the first electrical unit side wire 114d is introduced into the electrical control unit 112 through an opening provided on the casing of the electrical control unit 112.

The purge valve side connector 114b is configured to be attachable to and detachable from the first electrical unit side connector 114c. More specifically, the purge valve side connector 114b and first electrical unit side connector 114c are configured as a corresponding pair of connectors, and male and female ATX connectors, for example, may be employed therefore.

The rough valve 106 is a solenoid valve for connecting or isolating the cryopump 100 to or from the rough pump. The solenoid part of the rough valve 106 is connected to the electrical control unit 112 through a rough valve wire 116. The rough valve 106 is fitted to each of a pipe on the rough pump side and the refrigerator container 102c of the housing 102 via a quick coupling (which is a coupling compliant with ISO 2861-1 and also referred to as an NW type coupling or a KF type coupling). As a coupling, another elastomer-sealed vacuum coupling that can be easily attached and detached, such as a coupling compliant with ISO 1609 or a VF or VG flange, may also be used.

The rough valve 106 is open when it is energized through the rough valve wire 116; otherwise the rough valve 106 is closed. In other words, the electrical control unit 112 controls opening and closing of the rough valve 106 by supplying or not supplying power to the rough valve wire 116.

During the evacuation operation of the cryopump 100, the rough valve 106 is closed. When the cryopump 100 is started or during the regeneration process of the cryopump 100, the rough valve 106 is open. By operating the rough pump while the rough valve 106 is open, the pressure within the housing 102 can be reduced toward a low vacuum region of an operating pressure range of the cryopump 100, i.e., toward a base pressure level that is an operation starting pressure of the cryopump 100. The base pressure level corresponds to a high vacuum region of the rough pump and is included in an overlapping portion of operating pressure ranges of the rough pump and the cryopump 100. The base pressure level may be in a range equal to or more than 1 Pa and equal to or less than 10 Pa, for example.

The rough valve wire 116 includes a rough valve side wire 116a, a rough valve side connector 116b, a second electrical unit side connector 116c, and a second electrical unit side wire 116d. The rough valve wire 116 is configured in a similar way to the purge valve wire 114.

The vent valve 108 is a solenoid valve for connecting or isolating the cryopump 100 to or from an external environment. The solenoid part of the vent valve 108 is connected to the electrical control unit 112 through a vent valve wire 117. The vent valve 108 is fitted to the refrigerator container 102c of the housing 102 via a quick coupling.

The vent valve 108 is open when it is energized through the vent valve wire 117; otherwise the vent valve 108 is closed. In other words, the electrical control unit 112 controls opening and closing of the vent valve 108 by supplying or not supplying power to the vent valve wire 117.

The vent valve 108 is configured to also function as a safety valve. The force required to close the vent valve 108 is determined in advance so that the vent valve 108 opens mechanically when a predetermined differential pressure is exerted thereupon. The predetermined differential pressure can be set as appropriate in consideration of an internal pressure that could be exerted upon the housing 102 or the structural durability of the housing 102, for example. Since the external environment of the cryopump 100 is normally at an atmospheric pressure, the predetermined differential pressure is set to a predetermined value based on the atmospheric pressure.

During the evacuation operation of the cryopump 100, the vent valve 108 is closed. On the other hand, the vent valve 108 is opened when fluid is released from the cryopump 100, such as during the regeneration process of the cryopump 100. Also, the vent valve 108 is mechanically opened when a predetermined differential pressure, with the internal pressure of the housing 102 as the higher pressure, is exerted thereupon. Accordingly, if the internal pressure of the housing 102 rises too high for some reason, the vent valve 108 will be mechanically opened without requiring control, thereby releasing the high pressure in the housing 102. In this manner, the vent valve 108 functions as a safety valve.

The vent valve wire 117 includes a vent valve side wire 117a, a vent valve side connector 117b, a third electrical unit side connector 117c, and a third electrical unit side wire 117d. The vent valve wire 117 is configured in a similar way to the purge valve wire 114.

The Pirani gauge 110 periodically measures the internal pressure of the refrigerator container 102c, i.e., the internal pressure of the housing 102, and outputs an electric signal representing the measured pressure to the electrical control unit 112 through a gauge wire 118. The Pirani gauge 110 is fitted to the refrigerator container 102c of the housing 102 via a quick coupling. The Pirani gauge 110 may also be fitted to the trunk portion 102a.

The gauge wire 118 includes a fourth electrical unit side connector 118a, a fourth electrical unit side wire 118b, and a gauge side connector 118c. One end of the fourth electrical unit side wire 118b is connected to the fourth electrical unit side connector 118a, and the other end of the wire 118b is provided within the electrical control unit 112. The fourth electrical unit side connector 118a is configured to be attachable to and detachable from the gauge side connector 118c, which is provided on the casing of the Pirani gauge 110. For the fourth electrical unit side connector 118a and gauge side connector 118c, male and female D-sub connectors may be employed, for example.

Figure 4:
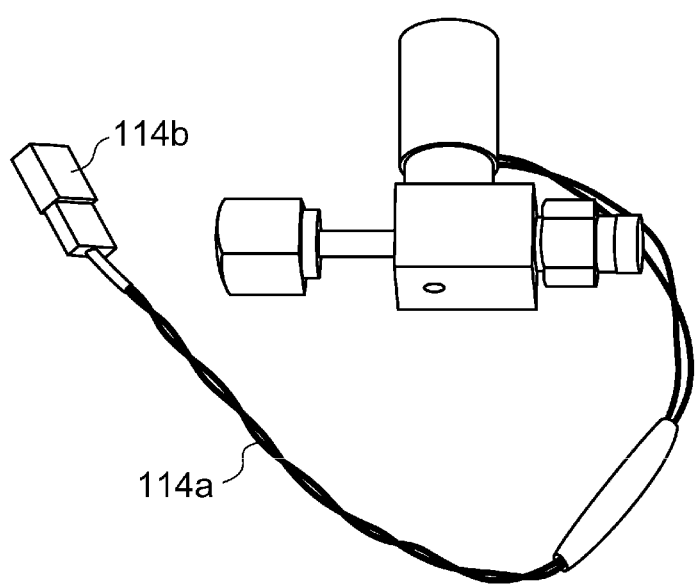
FIG. 4 is an outline view of a purge valve removed from a cryopump.

FIG. 4 is an outline view of the purge valve 104 removed from the cryopump 100. When the purge valve side connector 114b and first electrical unit side connector 114c are disconnected, the purge valve 104 can be removed in a state where the purge valve side connector 114b is connected thereto. More specifically, when the purge valve 104 is removed from the cryopump 100, the purge valve side connector 114b is disconnected from the first electrical unit side connector 114c and then the pipe joints are loosened. The purge valve side connector 114b thus disconnected remains connected to the removed purge valve 104.

Figure 5:
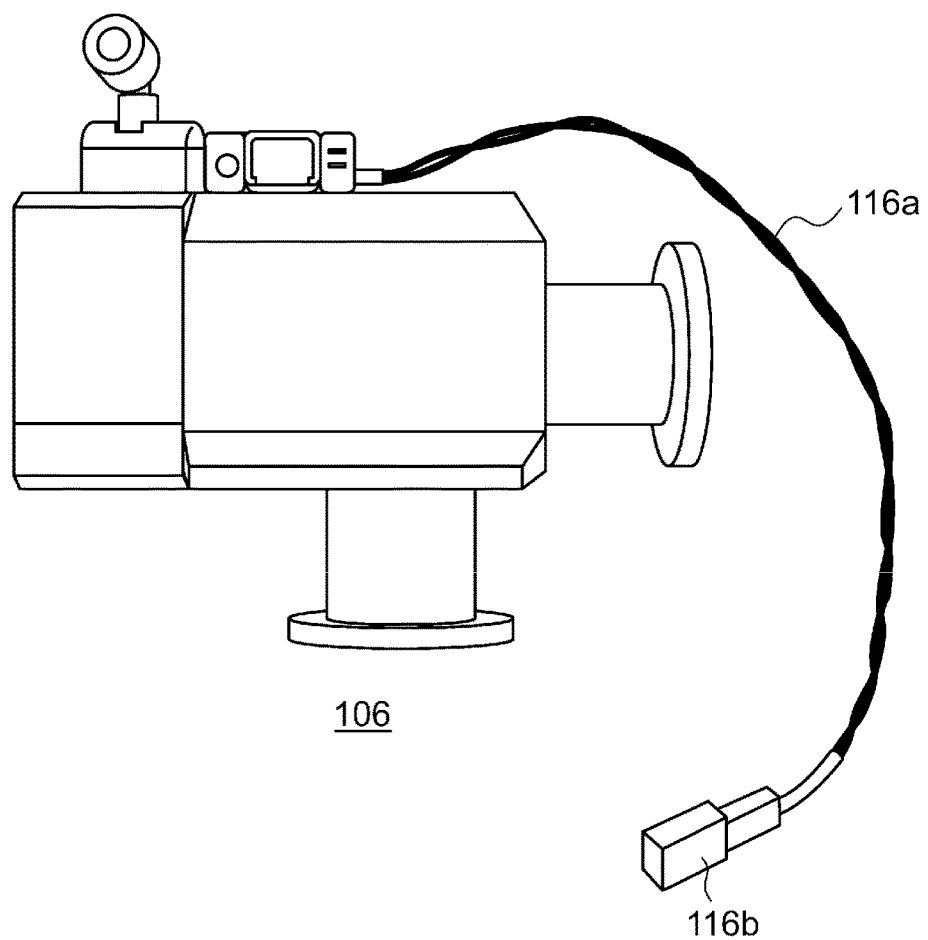
FIG. 5 is an outline view of a rough valve removed from a cryopump.

FIG. 5 is an outline view of the rough valve 106 removed from the cryopump 100. Similarly to the purge valve 104 shown in FIG. 4, the rough valve side connector 116b disconnected from the second electrical unit side connector 116c remains connected to the rough valve 106.

There will now be described the operation of the cryopump 100 having the configuration set forth above.

Before activating the cryopump 100, the inside of the housing 102 is roughly evacuated to about the operation starting pressure using a rough pump through the rough valve 106. The pressure is measured by the Pirani gauge 110. Thereafter, the cryopump 100 is operated. By driving the refrigerator 122 under the control of the electrical control unit 112, cooling stages (not shown) are cooled, and the baffle 128 and the cryopanel thermally connected to the cooling stages are also cooled accordingly.

The cooled baffle 128 cools gas molecules flowing from the vacuum chamber into the cryopump 100, so that a gas of which the vapor pressure is sufficiently lowered at the cooled temperature (e.g., water vapor or the like) is condensed on the surface of the baffle 128 to be pumped. A gas of which the vapor pressure is not sufficiently lowered at the cooling temperature of the baffle 128 passes through the baffle 128 and enters the inside of the trunk portion 102a. Among the gas molecules that have entered, molecules of gas of which the vapor pressure is sufficiently lowered at the cooling temperature of the cryopanel are condensed on the surface of the cryopanel to be pumped. A gas of which the vapor pressure is not sufficiently lowered at the cooling temperature of the cryopanel (e.g., hydrogen or the like) is adsorbed by an adsorbent (not shown), which is attached to the surface of the cryopanel and cooled, to be pumped. In this way, the cryopump 100 can attain a desired vacuum level in the vacuum chamber to which the cryopump is mounted.

As evacuation operation continues, gases are accumulated in the cryopump 100. In order to discharge the accumulated gases to the outside, regeneration of the cryopump 100 is performed when a predetermined period of time has elapsed after the evacuation operation started, or when a predetermined condition for starting the regeneration is satisfied.

A regeneration procedure includes a heating process, a discharging process, and a cooling process. In the heating process, the temperatures of the baffle 128 and the cryopanel are increased using a heater (not shown) or the like. The cryopanel is heated from a cooling temperature for the evacuation operation to a regeneration temperature near ambient temperatures, for example (such as about 300 K).

In the discharging process, a gas re-evaporated from the surface of the cryopanel is discharged to the outside of the cryopump 100. The re-evaporated gas is discharged outside via the rough valve 106 or the vent valve 108, for example. The re-evaporated gas may be discharged from the cryopump 100 together with purge gas that is supplied through the purge valve 104 as necessary.

In the cooling process, the cryopanel is re-cooled in order to restart the evacuation operation. The cooling operation of the refrigerator 122 is started. Rough pumping through the rough valve 106 may also be performed in at least part of the cooling process. In this manner, the regeneration procedure is completed.

In the cryopump 100 according to the present embodiment, connectors are provided in the wire that connects the electrical control unit 112 and each of the purge valve 104, rough valve 106, vent valve 108, and Pirani gauge 110, thereby facilitating the attachment and removal of such components. Accordingly, compared to the case where such components are directly connected to the electrical control unit by wires without connectors, the handling of the wires during changes of the components is more simplified in the present embodiment.

In the case of a conventional cryopump in which valves or pressure gauges are not modularized, it is difficult for users to change a faulty valve or a faulty pressure gauge by themselves. In order to change such a valve or pressure gauge, the procedure of opening the casing of the electrical control unit to disconnect the wires is generally required; accordingly, a person who performs such a procedure is required to have adequate knowledge of the internal structure of the electrical control unit and enough skill to disassemble and re-assemble the electrical control unit without damaging the unit. Therefore, despite knowing the faulty part, a user has often sent the whole cryopump in for repair or called a service engineer conventionally. However, such a situation is disadvantageous in terms of cost and it might take a long time to recover therefrom.

By using the modularized cryopump 100 according to the present embodiment, on the other hand, a user can repair the cryopump 100 more easily and swiftly by acquiring a new component corresponding to the faulty component from the manufacturer of the cryopump 100 and replacing the faulty component with the new component. Accordingly, also considering the ease of maintenance, the marketability of the cryopump 100 is improved, gaining an advantage in the cryopump market.

Figure 6:
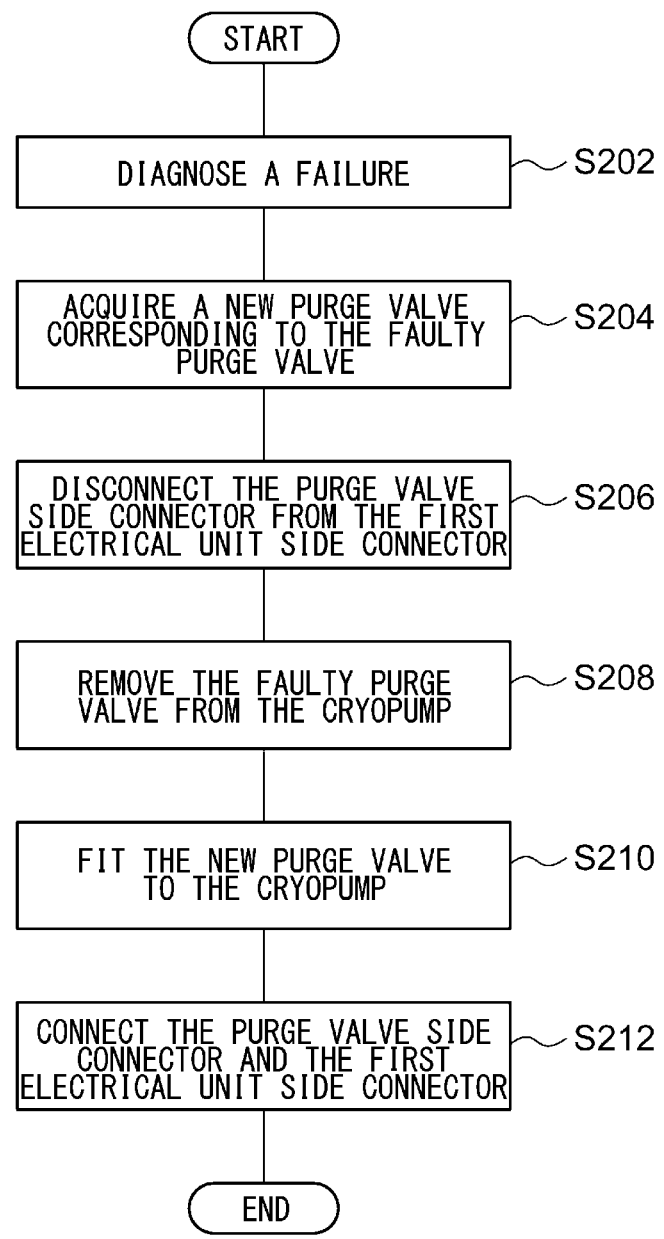
FIG. 6 is a flowchart that shows a series of procedures for repairing a cryopump when a purge valve has failed.

FIG. 6 is a flowchart that shows a series of procedures for repairing cryopump 100 when the purge valve 104 has failed. When a failure of the cryopump 100 is suspected as a loss of the ultimate vacuum level or an unusual noise has occurred, the user diagnoses the failure of the cryopump 100 according to a predetermined procedure described in the instruction manual of the cryopump 100 (S202). It is assumed here that, as a result of the diagnosis, a failure in the purge valve 104 is found. Accordingly, the user makes contact with the manufacturer of the cryopump 100 to acquire a new purge valve corresponding to the faulty purge valve 104 (S204). The user disconnects the purge valve side connector 114b from the first electrical unit side connector 114c (S206). The user then removes, from the cryopump 100, the faulty purge valve 104 to which the disconnected purge valve side connector 114b is still connected (S208). The user fits to the cryopump 100 the new purge valve acquired in step S204 (S210). Thereafter, the user connects the purge valve side connector of the new purge valve and the first electrical unit side connector 114c (S212). Thus, basically through the above steps, a change of the purge valve 104 of the cryopump 100 can be completed. In this manner, the user can restore the cryopump 100 more swiftly at low cost.

Alternatively, a field engineer in the manufacturer of the cryopump 100 may perform the above repairing procedure at the user's site.

In the cryopump 100 according to the present embodiment, the Pirani gauge 110 is used as a pressure gauge. Conventionally, a thermocouple vacuum gauge (also referred to as a TC gauge) has been often used as a pressure gauge. However, since it has higher resistance to foreign matter than a thermocouple vacuum gauge in principle, the Pirani gauge 110 is more suitable for use in a cryopump.

Further, because the cryopump 100 condenses gas molecules from the vacuum chamber and discharges them to the outside during regeneration, foreign matter is likely to intrude into a pressure gauge for measuring a pressure in the housing 102, causing frequent changing of the pressure gauge. In the present embodiment, a pressure gauge can be fitted to the housing 102 using a means that can be easily attached and detached, such as a quick coupling; therefore, a pressure gauge can be changed more smoothly.

The configuration and operation of the cryopump 100 according to an embodiment have been described above. The embodiment is intended to be illustrative only, and it will be obvious to those skilled in the art that various modifications to constituting elements could be developed and that such modifications also fall within the scope of the present invention.

The embodiment above describes a case where the purge valve 104 is fitted to the housing 102. However, the configuration is not limited thereto, and the purge valve 104 may be provided at any position on a passage between the inside of the housing 102 and the purge gas source. For example, the housing 102 and the purge valve 104 may be connected to each other via a pipe having a predetermined length. The same reasoning applies to the rough valve 106, vent valve 108, and Pirani gauge 110.

Although the embodiment above describes a case where the electrical control unit 112 is fitted to the refrigerator 122, the configuration is not limited thereto and they may be provided separately.

It should be understood that the invention is not limited to the above-described embodiment, but may be modified into various forms on the basis of the spirit of the invention. Additionally, the modifications are included in the scope of the invention.

Priority is claimed to Japanese Patent Application No. 2012-018834, filed Jan. 31, 2012, the entire content of which is incorporated herein by reference.

What is claimed is:
1. A cryopump, comprising:
a housing for the cryopump;
an electrical control unit configured to control the cryopump and comprising an electrical control unit side;
a purge valve provided on a passage between an external purge gas source and an inside of the housing and removably attached to the housing, the purge valve comprising a purge valve side;

a rough valve provided on a passage between an external pump and the inside of the housing and removably attached to the housing, the rough valve comprising a rough valve side;

a vent valve provided on a passage between the inside and an outside of the housing and removably attached to the housing, the vent valve comprising a vent valve side;

a pressure gauge operative to measure a pressure of the inside of the housing and removably attached to the housing, the pressure gauge comprising a gauge side;

a first externally extending wire arranged outside of the housing to electrically connect the electrical control unit to the purge valve, the first externally extending wire comprising a first electrical unit side connector on the electrical control unit side and a purge valve side connector on the purge valve side, the purge valve side connector configured to be attachable to and detachable from the first electrical unit side connector;

a second externally extending wire arranged outside of the housing to electrically connect the electrical control unit to the rough valve, the second externally extending wire comprising a second electrical unit side connector on the electrical control unit side and a rough valve side connector on the rough valve side, the rough valve side connector configured to be attachable to and detachable from the second electrical unit side connector;

a third externally extending wire arranged outside of the housing to electrically connect the electrical control unit to the vent valve, the third externally extending wire comprising a third electrical unit side connector on the electrical control unit side and a vent valve side connector on the vent valve side, the vent valve side connector configured to be attachable to and detachable from the third electrical unit side connector; and a fourth externally extending wire arranged outside of the housing to electrically connect the electrical control unit to the pressure gauge, the fourth externally extending wire comprising a fourth electrical unit side connector on the electrical control unit side and a pressure gauge connector on the gauge side, the gauge side connector configured to be attachable to and detachable from the fourth electrical unit side connector, wherein at least one of:

when the purge valve side connector and the first electrical unit side connector are disconnected and when the rough valve side connector, the vent valve side connector, and the gauge side connector are connected to the second electrical unit side connector, the third electrical unit side connector, and the fourth electrical unit side connector, respectively, the purge valve can be removed from the cryopump in a state where the purge valve side connector remains connected to the purge valve, and when the rough valve side connector and the second electrical unit side connector are disconnected and when the purge valve side connector, the vent valve side connector, and the gauge side connector are connected to the first electrical unit side connector, the third electrical unit side connector, and the fourth electrical unit side connector, respectively, the rough valve can be removed from the cryopump in a state where the rough valve side connector remains connected to the rough valve, and when the vent valve side connector and the third electrical unit side connector are disconnected and when the purge valve side connector, the rough valve side connector, and the gauge side connector are connected to the first electrical unit side connector, the second electrical unit side connector, and the fourth electrical unit side connector, respectively, the vent valve can be removed from the cryopump in a state where the vent valve side connector remains connected to the vent valve, and when the gauge side connector and the fourth electrical unit side connector are disconnected and when the purge valve side connector, the rough valve side connector, and the vent valve side connector are connected to the first electrical unit side connector, the second electrical unit side connector, and the third electrical unit side connector, respectively, the pressure gauge can be removed from the cryopump in a state where the gauge side connector remains connected to the pressure gauge.

2. The cryopump of claim 1, wherein:
the pressure gauge is a Pirani gauge; and
the electrical control unit is connected to the Pirani gauge via the fourth externally extending wire.

3. A method for repairing the cryopump according to claim 1, comprising:
diagnosing a failure of the cryopump, wherein a component of the cryopump is any one of the purge valve, the rough valve, the vent valve, and the pressure gauge, the component comprising a component side;
disconnecting, when a failure is found in the component, a connector on the component side from a connector on the electrical control unit side;
removing from the cryopump the component to which the connector on the component side is connected;
fitting to the cryopump a new component corresponding to the component, the new component comprises a new component side; and
connecting a connector on the new component side and the connector on the electrical control unit side.

4. A cryopump, comprising:
a housing;
an electrical control unit that comprises an electrical control unit side and is configured to control the cryopump;
a plurality of components connected to the electrical control unit, each of the components removably attached to the housing and comprising a component side; and
a plurality of externally extending wires arranged outside of the housing to electrically connect the electrical control unit to the components individually, each of the externally extending wires comprising an electrical unit side connector on the electrical control unit side and a component side connector on the component side, the component side connector configured to be attachable to and detachable from the electrical unit side connector, wherein
when the component side connector and the electrical unit side connector of a respective one of the externally extending wires are disconnected and when the component side connector and the electrical unit side connector of a different one of the externally extending wires are connected, the component connected to the electrical control unit via the respective one of the externally extending wires can be removed from the cryopump in a state where the component side connector of the respective one of the externally extending wires remains connected to the component.

5. The cryopump, according to claim 4, wherein
the components include a purge valve, a rough valve, a vent valve, and a pressure gauge;
the purge valve is provided on a passage between an external purge gas source and an inside of the housing;
the rough valve is provided on a passage between an external pump and the inside of the housing;
the vent valve is provided on a passage between the inside of the housing and an outside of the housing; and
the pressure gauge is operative to measure a pressure of the inside of the housing.

6. A method for repairing the cryopump according to claim 4, comprising:
diagnosing a failure of the cryopump, wherein a respective component of the cryopump is one of the plurality of components;
disconnecting, when a failure is found in the respective component, a connector on the component side from a connector on the electrical control unit side;
removing from the cryopump the respective component to which the connector on the component side is connected;
fitting to the cryopump a new component corresponding to the respective component, the new component including a new component side; and
connecting a connector on the new component side and the connector on the electrical control unit side.

7. A method for repairing the cryopump according to claim 5, comprising:
diagnosing a failure of the cryopump, wherein a respective component of the cryopump is any one of the purge valve, the rough valve, the vent valve, and the pressure gauge;
disconnecting, when a failure is found in the respective component, a connector on the component side from a connector on the electrical control unit side;
removing from the cryopump the respective component to which the connector on the component side is connected;
fitting to the cryopump a new component corresponding to the respective component, the new component including a new component side; and
connecting a connector on the new component side and the connector on the electrical control unit side.

\* \* \* \* \*